March 14, 1961

G. M. FORD 2,975,352

BATTERY CHARGING GENERATOR REGULATOR AND
REVERSE CURRENT ELIMINATING DIODE

Filed Nov. 19, 1956

INVENTOR.
GERALD M. FORD
BY
ATTORNEYS

United States Patent Office 2,975,352
Patented Mar. 14, 1961

2,975,352

BATTERY CHARGING GENERATOR REGULATOR AND REVERSE CURRENT ELIMINATING DIODE

Gerald M. Ford, 1209 Jayne Drive, Kokomo, Ind.

Filed Nov. 19, 1956, Ser. No. 623,266

2 Claims. (Cl. 320—12)

(Granted under Title 35, U.S. Code (1952), sec. 266)

This invention described herein may be manufactured and used by or for the Government of the United States of America for governmental purposes without the payment of any royalties thereon or therefor.

This invention relates to current regulators for generator-storage battery systems and more particularly to current regulator transistor circuits having no mechanical vibrating elements that are capable of regulating the charging rate of the generator in accordance with the current demands of the system.

In prior known voltage and current regulator systems mechanical relays have been used for both voltage and current regulation in which the mechanical relays vibrate at high frequency in equilibrium between forces of magnetic attraction and mechanical biasing means to regulate the current and voltage of a storage battery system. Mechanical relays are also used in these systems to prevent back flow of current to eliminate battery discharge when the generator is not in operation. Such mechanical relays are subject to failure or improper operation as a result of oxidation of the contacts or of the points becoming dirty or burned from sparking. Mechanical relays are inherently of considerable weight and size which are objectionable in many applications such as use in an aircraft where space and weight are at a premium.

In the present invention no mechanical relays need be used and all switching and unidirectional current flow means are carried out by transistor and diode means. In this invention a single transistor has certain electrodes coupled in parallel to the generator field coil and other electrodes in parallel to a low impedance element to control the current in the field coil and thus control the generator current output. A diode is used in one of the coupling leads from generator-to-storage battery to allow current to flow in only one direction thus preventing storage battery discharge when the generator is not operating. A light indicating means is incorporated in the circuit to indicate when the generator is not operating in a charging condition. It is, therefore, a general object of this invention to provide a generator current regulator transistor circuit for regulating the charging rate on a storage battery and the currents used in a load circuit, the switching for which regulator is completely electronic, and to provide a reverse current eliminating means to prevent battery discharge.

These and other objects, advantages, features, and uses will become more apparent to those skilled in the art as the description proceeds when considered together with the accompanying drawing, in which.

Figure 1:
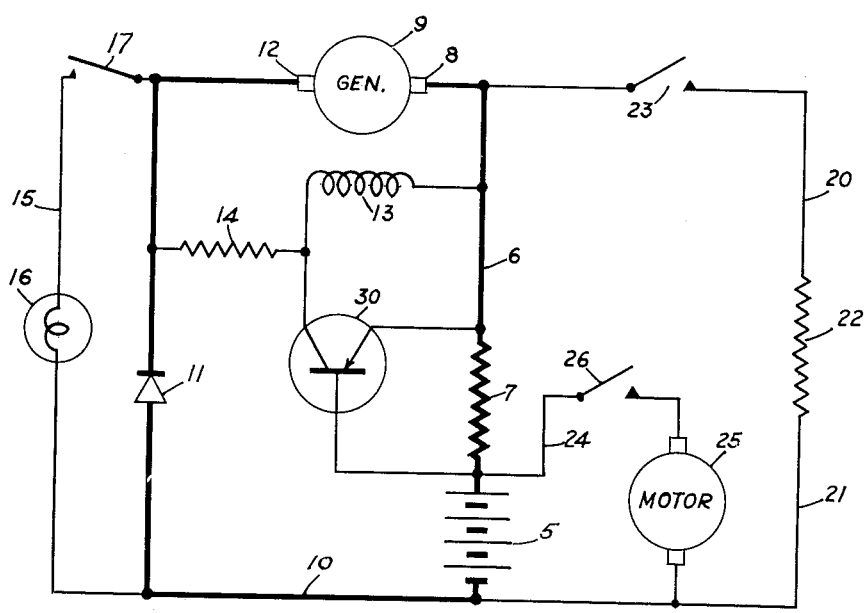
Figure 1 is a schematic wiring diagram illustrating the invention.

Referring more particularly to Figure 1, there is shown a generator-storage battery system in which a storage battery 5 has one lead 6 coupled through a low impedance resistance 7 to one terminal 8 of a generator 9. The other terminal of the storage battery 5 is coupled by a lead 10 through a diode 11 to the terminal 12 of the generator 9. The system may be arranged for either polarity, but for the purpose of illustrating the invention herein the lead 6 is shown as the positive lead in the system and the lead 10 the negative. Across the terminals of the generator 9 is connected a field coil 13 which is placed in series with a low impedance resistance 14, the field coil 13 and resistor 14 being in shunt across these terminals. In parallel to the diode 11 is a lamp circuit through the conductor 15 having an incandescent lamp 16 in series to glow whenever the generator 9 is inactive. The lamp circuit 15 is normally through the ignition switch of the vehicle or other switch means of the vehicle where the regulator is used, this switch being represented herein by the switch 17 for the purpose of illustration. When the generator 9 is in the non-generating state or static condition, the lamp 16 will glow when switch 17 is closed by reason of having the storage battery 5 voltage directly across it through the generator 9 armature, not specifically shown. Upon the generator becoming rotated in a well known manner to generate a voltage across the diode, the lamp 16 will be extinguished since the voltage drop across the diode is exceedingly low.

A load circuit is established by leads 20 and 21 across the storage battery 5 and the low impedance resistance 7 to supply current and voltage to any number of load equipment elements herein represented generally by the resistance load 22. Switching of these loads is represented generally herein by the switch 23. When this generator-storage battery regulator system is used in a vehicle such as an aircraft, the electrical system 20 and 21 will supply such devices as the ignition system, lights, radio, radar, and like equipment. A separate circuit 24, being coupled to a motor 25 with the return lead through the conductor 21 to the battery, is shown to illustrate the circuit to be set up for starter motors of the engines, such as the aircraft engines, in which the system is used. The circuit 24, 25, 21 has a switch 26 generally representing the switch to the starter motor although it may be understood that several such circuits and starter motors may be used for starting each engine of the aircraft, or the like. It is to be noted that this starter motor circuit is made directly across the storage battery 5 and does not include the low impedance resistance 7 therein.

In order to control the current flow in the field coil 13 of generator 9 to regulate the charging rate of the battery, a transistor 30 having base, emitter, and collector terminals is used to control this field coil current. The emitter and collector terminals of transistor 30 are coupled in parallel across the field coil 13 of generator 9. The emitter and base terminals are coupled in parallel to the low impedance resistance 7, it being understood that the emitter is coupled to a point common to the juncture of the terminal 8 of generator 9, field coil 13, and the low impedance resistance element 7 although the wiring schematic herein shows this emitter coupled to the conductor 6. In this particular illustration the emitter and base are coupled into the positive side of the system while the collector is coupled to a lower potential or the negative or grounded side of system. The transistor 30 and storage battery 5 are selected in accordance with the voltage requirements which may be anywhere from 6 to 50 volts for transistors presently known. While transistors of the future may handle currents and voltages higher than those resulting from 50 volts, as herein stated, it is to be understood that the invention is not in any way limited by voltage limitations.

In the operation of the voltage regulator as illustrated in Figure 1, let it be assumed that the generator 9 is inactive at which time the lamp 16 will be glowing when switch 17 is closed by reason of the storage battery 5 having its voltage placed directly across the lamp 16 through the generator 9 and conductors 10 and 15. By reason of the diode 11 no back current of the storage battery 5 can flow through the generator 9 armature by way of conductors 6 and 10 to discharge the battery since the circuit through the conductors 6 and 10 and generator 9 is substantially broken at the diode 11. At any time that either or both switches 23 and 26 are closed, with or without the generator 9 operating, the load 22 and/or the motor 25 will be supplied current in accordance with the battery voltage 5. Upon the generator 9 being driven to begin generating current, the field coil 13 will be energized and a voltage will be established across the generator terminals 8 and 12 in a well understood manner. If the generator voltage is higher than the battery voltage, there will be a voltage drop across resistor 7 in a direction to cause transistor 30 to conduct from emitter to collector. This bypasses some of the field current causing the generator voltage to be reduced which reduces the voltage drop across the resistor 7. The charging rate will therefore be determined by resistor 7 and the characteristics of transistor 30 base-to-emitter voltage drop. The generated current from the generator 9 will flow into the battery 5 by the leads 6 and 10, the current direction through the diode 11 being such to establish a circuit through this diode to the battery. Since the diode 11 is biased in the forward direction when the generator voltage is greater than battery voltage, the voltage across this diode is exceedingly small and, therefore, insufficient to keep the lamp 16 in an incandescent state. Extinguishment of the lamp 16 indicates that the generator is operating properly for generating current. At any time that an additional load as at 22 is required to be supplied by closing the switch 23, the voltage drop will decrease across the low impedance resistance 7 to reduce the conduction in transistor 30 and increase the conduction in the field coil 13 to bring the current generation of the generator 9 up to the point of the additional demand of the load 22. In this manner all loads will be supplied at the predetermined voltage level of the battery 5 by the generator 9 to the extent of its capacity to generate currents and maintain the voltage level.

Figure 2:
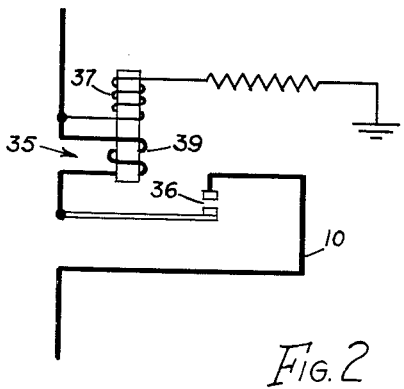
Figure 2 illustrates a mechanical relay which may be used in the circuit of Figure 1.

Referring more particularly to Figure 2, there is shown a current relay 35 of well known design which may be used in substitution for the diode 11 in the conductor 10. As is well known, when the contacts 36 are open and generation begins, current is established through the secondary winding 37 sufficient to close the contacts 36 which will thereafter be held closed by reason of the primary current winding 39. The relay 35 can be used in combination with the transistor 30 switching circuit although the advantage of space and weight saving is lost in such combination and there is greater possibility of storage battery discharge by reasons of the mechanical contacts clinging together.

While many modifications and changes may be made in the constructional details and circuit arrangements, as illustrated, using various polarity arrangements and types of transistors, I desire to be limited only by the scope of the appended claims. For example, while transistor 30 is shown as being of the P–N–P type, it is to be understood that the invention is readily adaptable for N–P–N transistors as well as for transistors of more than three terminals.

I claim:
1. A transistor current regulator for generator-battery systems comprising: a generator having a field coil and a first low impedance resistance in series shunting said generator; a storage battery coupled in circuit with said generator, said circuit including a unidirectional means oriented to permit flow of current only from said generator to said battery and including a second low impedance resistance between one terminal of said battery and one terminal of said generator; a transistor having base, emitter, and collector electrodes, the emitter and collector electrodes being coupled in parallel to said field coil and the emitter and base electrodes being coupled in parallel to said second low impedance resistance; and a load output coupled across said battery and said second low impedance resistance whereby the current in said field coil will be controlled by division of current between said field coil and said emitter-collector circuit of said transistor in accordance with transistor conduction produced by the base-to-emitter voltage in response to the voltage drop across the second low impedance resistance occasioned by the relative voltages of said generator and said battery and the current drain of said load output.

2. A transistor current regulator as set forth in claim 1 wherein said unidirectional means is a diode, said diode being between the other terminals of said generator-battery circuit.

References Cited in the file of this patent

UNITED STATES PATENTS

| | | |
|---|---|---|
| 760,714 | Turbayne | May 24, 1904 |
| 1,205,181 | Fessenden | Nov. 21, 1916 |
| 1,291,107 | Pearson | Jan. 14, 1919 |
| 1,434,869 | Wold et al. | Nov. 7, 1922 |
| 1,459,427 | Wold | June 19, 1923 |
| 2,693,568 | Chase | Nov. 2, 1954 |
| 2,721,993 | Medlar | Oct. 25, 1955 |
| 2,780,765 | Chapin et al. | Feb. 5, 1957 |
| 2,780,766 | Heding et al. | Feb. 5, 1957 |
| 2,809,301 | Short | Oct. 8, 1957 |
| 2,817,830 | Raver | Dec. 24, 1957 |
| 2,862,175 | Guyton et al. | Nov. 25, 1958 |

FOREIGN PATENTS

| | | |
|---|---|---|
| 289,939 | Great Britain | Feb. 7, 1927 |
| 566,811 | France | May 17, 1924 |
| 847,864 | France | July 10, 1939 |